US012796692B2

(12) United States Patent
Huang et al.

(10) Patent No.: US 12,796,692 B2
(45) **Date of Patent: *Nov. 17, 2026**

(54) METHOD OF USING/APPLYING A KERATIN HYDROLYSIS PEPTIDE SOLUTION TO PROMOTE SOYBEAN GROWTH UNDER LOW LIGHT CONDITION

(71) Applicant: CH Biotech R&D Co., Ltd., Nantou (TW)

(72) Inventors: Jenn Wen Huang, Taichung (TW); Ching-Chi Tsai, Taichung (TW); Yu-Yi Wu, Taichung (TW); Nai-Hua Ye, Changhua (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 313 days.

This patent is subject to a terminal disclaimer.

(21) Appl. No.: 18/639,751

(22) Filed: Apr. 18, 2024

(65) Prior Publication Data

US 2025/0160336 A1 May 22, 2025

(30) Foreign Application Priority Data

Nov. 17, 2023 (TW) ................................ 112144620

(51) Int. Cl.

*A01N 63/50* (2020.01)
*A01N 25/02* (2006.01)
*A01P 21/00* (2006.01)

(52) U.S. Cl.

CPC ............. *A01N 63/50* (2020.01); *A01N 25/02* (2013.01); *A01P 21/00* (2021.08)

(58) Field of Classification Search

CPC .......... A01N 63/50; A01N 25/02; A01P 21/00
See application file for complete search history.

(56) References Cited

U.S. PATENT DOCUMENTS

| | | | | |
|---|---|---|---|---|
| 8,617,282 | B2 * | 12/2013 | Szoeke | C05D 9/02 71/64.1 |
| 12,527,269 | B2 * | 1/2026 | Huang | A01H 3/04 |
| 2025/0081910 | A1 * | 3/2025 | Huang | C05G 5/23 |
| 2025/0081964 | A1 * | 3/2025 | Chen | A01N 37/46 |
| 2025/0081965 | A1 * | 3/2025 | Chen | A01P 21/00 |
| 2025/0081972 | A1 * | 3/2025 | Xia | A01N 63/50 |
| 2025/0084010 | A1 * | 3/2025 | Xia | C05G 5/23 |
| 2025/0084134 | A1 * | 3/2025 | Xia | C05F 11/10 |
| 2025/0101072 | A1 * | 3/2025 | Chen | A01H 1/1225 |
| 2025/0113794 | A1 * | 4/2025 | Xia | G01N 33/6848 |
| 2025/0113828 | A1 * | 4/2025 | Huang | A01N 63/50 |
| 2025/0127107 | A1 * | 4/2025 | Huang | C07K 1/12 |
| 2025/0128994 | A1 * | 4/2025 | Xia | C05F 11/10 |
| 2025/0128995 | A1 * | 4/2025 | Xia | C05F 11/10 |
| 2025/0136523 | A1 * | 5/2025 | Huang | C05C 11/00 |
| 2025/0136524 | A1 * | 5/2025 | Xia | C05F 1/005 |
| 2025/0143323 | A1 * | 5/2025 | Chen | A01P 21/00 |
| 2025/0145678 | A1 * | 5/2025 | Xia | C07K 14/4741 |
| 2025/0160325 | A1 * | 5/2025 | Xia | C12P 21/06 |
| 2025/0160337 | A1 * | 5/2025 | Xia | A01N 63/50 |
| 2025/0160338 | A1 * | 5/2025 | Xia | A01N 37/46 |
| 2025/0169507 | A1 * | 5/2025 | Xia | A01N 63/50 |
| 2025/0176560 | A1 * | 6/2025 | Xia | A01P 21/00 |
| 2025/0187995 | A1 * | 6/2025 | Chen | C05F 1/005 |
| 2025/0194606 | A1 * | 6/2025 | Xia | A01P 21/00 |
| 2025/0206677 | A1 * | 6/2025 | Xia | C05F 1/005 |
| 2025/0212892 | A1 * | 7/2025 | Chen | A01N 63/50 |
| 2025/0212893 | A1 * | 7/2025 | Huang | A01P 21/00 |
| 2025/0214906 | A1 * | 7/2025 | Xia | C05C 11/00 |
| 2025/0324978 | A1 * | 10/2025 | Huang | A01N 25/02 |
| 2025/0331517 | A1 * | 10/2025 | Huang | A01N 37/46 |

FOREIGN PATENT DOCUMENTS

| | | | |
|---|---|---|---|
| CN | 109650946 | * | 9/2021 |
| CN | 109650946 B | * | 9/2021 |
| WO | WO 2023001946 | * | 1/2023 |

OTHER PUBLICATIONS

Cheng et al. (Hydrolysis technology of biomass waste to produce amino acids in sub-critical water), Bioresource Technology, vol. 99, Jun. 2008, pp. 3337-3341. (Year: 2008).*

Yin et al, (Self-organization of oligopeptides obtained on dissolution of feather keratins in superheated water), Biomacromolecules, 2007, 8, pp. 800-806. (Year: 2007).*

Minkiewicz et al (BIOPEP-UWM database of the bioactive peptides: Current opportunities)., Int J Mol Sci. 2019, 20(23):5978, pp. 1-23. (Year: 2019).*

* cited by examiner

*Primary Examiner* — Mina Haghighatian
(74) *Attorney, Agent, or Firm* — Jen-Feng Lee, Esq.

(57) ABSTRACT

Present invention teaches the method of using a keratin hydrolysis peptide ("KHP") solution to improve the growth of soybean under low light conditions. By selectively choosing specific weights of feathers and water, and treating the mixture to a high-temperature high-pressure hydrolysis process, the resulting solution is confirmed to contain at least 253 peptides and then infused to the soil containing the soybean seeds or seedlings, the solution can also be sprayed to the leaf surface of soybean plants. Optionally, the KHP solution can be diluted by water, as disclosed in the specification, for applying to the soil and for spraying to leaf surface of soybean plants.

6 Claims, 9 Drawing Sheets

Specification includes a Sequence Listing.

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                                  6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                                 7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                                 7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                                  6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                                 7

SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                                  6

SEQ ID NO: 7            moltype = AA  length = 7
FEATURE                 Location/Qualifiers
```

-continued

```
source                 1..7
                       mol_type = protein
                       organism = Gallus gallus
SEQUENCE: 7
SLLSQGA                                                                 7

SEQ ID NO: 8           moltype = AA  length = 6
FEATURE                Location/Qualifiers
source                 1..6
                       mol_type = protein
                       organism = Gallus gallus
SEQUENCE: 8
FNLRGA                                                                  6

SEQ ID NO: 9           moltype = AA  length = 8
FEATURE                Location/Qualifiers
source                 1..8
                       mol_type = protein
                       organism = Gallus gallus
SEQUENCE: 9
SAAVGSSL                                                                8

SEQ ID NO: 10          moltype = AA  length = 6
FEATURE                Location/Qualifiers
source                 1..6
                       mol_type = protein
                       organism = Gallus gallus
SEQUENCE: 10
SRVVIQ                                                                  6

SEQ ID NO: 11          moltype = AA  length = 6
FEATURE                Location/Qualifiers
source                 1..6
                       mol_type = protein
                       organism = Gallus gallus
SEQUENCE: 11
SRVVLE                                                                  6

SEQ ID NO: 12          moltype = AA  length = 8
FEATURE                Location/Qualifiers
source                 1..8
                       mol_type = protein
                       organism = Gallus gallus
SEQUENCE: 12
GFGISGLG                                                                8

SEQ ID NO: 13          moltype = AA  length = 6
FEATURE                Location/Qualifiers
source                 1..6
                       mol_type = protein
                       organism = Gallus gallus
SEQUENCE: 13
SRFSGR                                                                  6

SEQ ID NO: 14          moltype = AA  length = 6
FEATURE                Location/Qualifiers
source                 1..6
                       mol_type = protein
                       organism = Gallus gallus
SEQUENCE: 14
RVVIQP                                                                  6

SEQ ID NO: 15          moltype = AA  length = 8
FEATURE                Location/Qualifiers
source                 1..8
                       mol_type = protein
                       organism = Gallus gallus
SEQUENCE: 15
SAAVGSIL                                                                8

SEQ ID NO: 16          moltype = AA  length = 7
FEATURE                Location/Qualifiers
source                 1..7
                       mol_type = protein
                       organism = Gallus gallus
SEQUENCE: 16
IVVIGHV                                                                 7

SEQ ID NO: 17          moltype = AA  length = 9
```

-continued

```
FEATURE                Location/Qualifiers
source                 1..9
                       mol_type = protein
                       organism = Gallus gallus
SEQUENCE: 17
TAVGSSTSA                                                  9

SEQ ID NO: 18          moltype = AA  length = 7
FEATURE                Location/Qualifiers
source                 1..7
                       mol_type = protein
                       organism = Gallus gallus
SEQUENCE: 18
RVVIQPS                                                    7

SEQ ID NO: 19          moltype = AA  length = 7
FEATURE                Location/Qualifiers
source                 1..7
                       mol_type = protein
                       organism = Gallus gallus
SEQUENCE: 19
SRVVIQP                                                    7

SEQ ID NO: 20          moltype = AA  length = 7
FEATURE                Location/Qualifiers
source                 1..7
                       mol_type = protein
                       organism = Gallus gallus
SEQUENCE: 20
PQGEQLQ                                                    7

SEQ ID NO: 21          moltype = AA  length = 9
FEATURE                Location/Qualifiers
source                 1..9
                       mol_type = protein
                       organism = Gallus gallus
SEQUENCE: 21
RAGAGPPSP                                                  9

SEQ ID NO: 22          moltype = AA  length = 7
FEATURE                Location/Qualifiers
source                 1..7
                       mol_type = protein
                       organism = Gallus gallus
SEQUENCE: 22
DSRVVIQ                                                    7

SEQ ID NO: 23          moltype = AA  length = 8
FEATURE                Location/Qualifiers
source                 1..8
                       mol_type = protein
                       organism = Gallus gallus
SEQUENCE: 23
PGPILSSF                                                   8

SEQ ID NO: 24          moltype = AA  length = 9
FEATURE                Location/Qualifiers
source                 1..9
                       mol_type = protein
                       organism = Gallus gallus
SEQUENCE: 24
PISSGGFGI                                                  9

SEQ ID NO: 25          moltype = AA  length = 8
FEATURE                Location/Qualifiers
source                 1..8
                       mol_type = protein
                       organism = Gallus gallus
SEQUENCE: 25
ISGLGSRF                                                   8

SEQ ID NO: 26          moltype = AA  length = 10
FEATURE                Location/Qualifiers
source                 1..10
                       mol_type = protein
                       organism = Gallus gallus
SEQUENCE: 26
SGGFGISGLG                                                 10
```

-continued

```
SEQ ID NO: 27          moltype = AA  length = 7
FEATURE                Location/Qualifiers
source                 1..7
                       mol_type = protein
                       organism = Gallus gallus
SEQUENCE: 27
SRFSGRR                                                     7

SEQ ID NO: 28          moltype = AA  length = 9
FEATURE                Location/Qualifiers
source                 1..9
                       mol_type = protein
                       organism = Gallus gallus
SEQUENCE: 28
PGLALPVLP                                                   9

SEQ ID NO: 29          moltype = AA  length = 8
FEATURE                Location/Qualifiers
source                 1..8
                       mol_type = protein
                       organism = Gallus gallus
SEQUENCE: 29
SRVVIQPS                                                    8

SEQ ID NO: 30          moltype = AA  length = 8
FEATURE                Location/Qualifiers
source                 1..8
                       mol_type = protein
                       organism = Gallus gallus
SEQUENCE: 30
PILSSFPQ                                                    8

SEQ ID NO: 31          moltype = AA  length = 8
FEATURE                Location/Qualifiers
source                 1..8
                       mol_type = protein
                       organism = Gallus gallus
SEQUENCE: 31
LGSGIFWI                                                    8

SEQ ID NO: 32          moltype = AA  length = 9
FEATURE                Location/Qualifiers
source                 1..9
                       mol_type = protein
                       organism = Gallus gallus
SEQUENCE: 32
GISGLGSRF                                                   9

SEQ ID NO: 33          moltype = AA  length = 9
FEATURE                Location/Qualifiers
source                 1..9
                       mol_type = protein
                       organism = Gallus gallus
SEQUENCE: 33
VVVTLPGPI                                                   9

SEQ ID NO: 34          moltype = AA  length = 8
FEATURE                Location/Qualifiers
source                 1..8
                       mol_type = protein
                       organism = Gallus gallus
SEQUENCE: 34
CRLSLSQP                                                    8

SEQ ID NO: 35          moltype = AA  length = 11
FEATURE                Location/Qualifiers
source                 1..11
                       mol_type = protein
                       organism = Gallus gallus
SEQUENCE: 35
SAAVGSSLSA G                                                11

SEQ ID NO: 36          moltype = AA  length = 11
FEATURE                Location/Qualifiers
source                 1..11
                       mol_type = protein
                       organism = Gallus gallus
SEQUENCE: 36
AVGSSTSAAV G                                                11
```

```
SEQ ID NO: 37          moltype = AA  length = 9
FEATURE                Location/Qualifiers
source                 1..9
                       mol_type = protein
                       organism = Gallus gallus
SEQUENCE: 37
VVTLPGPIL                                                    9

SEQ ID NO: 38          moltype = AA  length = 9
FEATURE                Location/Qualifiers
source                 1..9
                       mol_type = protein
                       organism = Gallus gallus
SEQUENCE: 38
PGPILSSFP                                                    9

SEQ ID NO: 39          moltype = AA  length = 10
FEATURE                Location/Qualifiers
source                 1..10
                       mol_type = protein
                       organism = Gallus gallus
SEQUENCE: 39
SAAVGSILSE                                                   10

SEQ ID NO: 40          moltype = AA  length = 10
FEATURE                Location/Qualifiers
source                 1..10
                       mol_type = protein
                       organism = Gallus gallus
SEQUENCE: 40
VPISSGGFGI                                                   10

SEQ ID NO: 41          moltype = AA  length = 8
FEATURE                Location/Qualifiers
source                 1..8
                       mol_type = protein
                       organism = Gallus gallus
SEQUENCE: 41
QLAQRNTI                                                     8

SEQ ID NO: 42          moltype = AA  length = 9
FEATURE                Location/Qualifiers
source                 1..9
                       mol_type = protein
                       organism = Gallus gallus
SEQUENCE: 42
LSGLRSNLS                                                    9

SEQ ID NO: 43          moltype = AA  length = 10
FEATURE                Location/Qualifiers
source                 1..10
                       mol_type = protein
                       organism = Gallus gallus
SEQUENCE: 43
PSPVVVTLPG                                                   10

SEQ ID NO: 44          moltype = AA  length = 10
FEATURE                Location/Qualifiers
source                 1..10
                       mol_type = protein
                       organism = Gallus gallus
SEQUENCE: 44
PPPVVVTLPG                                                   10

SEQ ID NO: 45          moltype = AA  length = 10
FEATURE                Location/Qualifiers
source                 1..10
                       mol_type = protein
                       organism = Gallus gallus
SEQUENCE: 45
ISGLGSRFSG                                                   10

SEQ ID NO: 46          moltype = AA  length = 9
FEATURE                Location/Qualifiers
source                 1..9
                       mol_type = protein
                       organism = Gallus gallus
SEQUENCE: 46
```

```
LALRQSVEA                                                   9

SEQ ID NO: 47          moltype = AA  length = 10
FEATURE                Location/Qualifiers
source                 1..10
                       mol_type = protein
                       organism = Gallus gallus
SEQUENCE: 47
PLLGPPLLGI                                                  10

SEQ ID NO: 48          moltype = AA  length = 10
FEATURE                Location/Qualifiers
source                 1..10
                       mol_type = protein
                       organism = Gallus gallus
SEQUENCE: 48
VVTLPGPILS                                                  10

SEQ ID NO: 49          moltype = AA  length = 8
FEATURE                Location/Qualifiers
source                 1..8
                       mol_type = protein
                       organism = Gallus gallus
SEQUENCE: 49
VTLEDLRR                                                    8

SEQ ID NO: 50          moltype = AA  length = 9
FEATURE                Location/Qualifiers
source                 1..9
                       mol_type = protein
                       organism = Gallus gallus
SEQUENCE: 50
PILSSFPQN                                                   9

SEQ ID NO: 51          moltype = AA  length = 9
FEATURE                Location/Qualifiers
source                 1..9
                       mol_type = protein
                       organism = Gallus gallus
SEQUENCE: 51
PILSSFPQD                                                   9

SEQ ID NO: 52          moltype = AA  length = 11
FEATURE                Location/Qualifiers
source                 1..11
                       mol_type = protein
                       organism = Gallus gallus
SEQUENCE: 52
GTVGVSAGVT R                                                11

SEQ ID NO: 53          moltype = AA  length = 9
FEATURE                Location/Qualifiers
source                 1..9
                       mol_type = protein
                       organism = Gallus gallus
SEQUENCE: 53
FGLSRVTLN                                                   9

SEQ ID NO: 54          moltype = AA  length = 12
FEATURE                Location/Qualifiers
source                 1..12
                       mol_type = protein
                       organism = Gallus gallus
SEQUENCE: 54
TAVGSSTSAA VG                                               12

SEQ ID NO: 55          moltype = AA  length = 10
FEATURE                Location/Qualifiers
source                 1..10
                       mol_type = protein
                       organism = Gallus gallus
SEQUENCE: 55
VVVTLPGPIL                                                  10

SEQ ID NO: 56          moltype = AA  length = 10
FEATURE                Location/Qualifiers
source                 1..10
                       mol_type = protein
                       organism = Gallus gallus
```

```
SEQUENCE: 56
PPVVVTFPGP                                                      10

SEQ ID NO: 57           moltype = AA  length = 10
FEATURE                 Location/Qualifiers
source                  1..10
                        mol_type = protein
                        organism = Gallus gallus
SEQUENCE: 57
PPPVVVTFPG                                                      10

SEQ ID NO: 58           moltype = AA  length = 10
FEATURE                 Location/Qualifiers
source                  1..10
                        mol_type = protein
                        organism = Gallus gallus
SEQUENCE: 58
VVIQPSPVVV                                                      10

SEQ ID NO: 59           moltype = AA  length = 10
FEATURE                 Location/Qualifiers
source                  1..10
                        mol_type = protein
                        organism = Gallus gallus
SEQUENCE: 59
FGISGLGSRF                                                      10

SEQ ID NO: 60           moltype = AA  length = 10
FEATURE                 Location/Qualifiers
source                  1..10
                        mol_type = protein
                        organism = Gallus gallus
SEQUENCE: 60
PGPILSSFPQ                                                      10

SEQ ID NO: 61           moltype = AA  length = 10
FEATURE                 Location/Qualifiers
source                  1..10
                        mol_type = protein
                        organism = Gallus gallus
SEQUENCE: 61
FGWSGLGRGL                                                      10

SEQ ID NO: 62           moltype = AA  length = 9
FEATURE                 Location/Qualifiers
source                  1..9
                        mol_type = protein
                        organism = Gallus gallus
SEQUENCE: 62
LEAQLSELR                                                       9

SEQ ID NO: 63           moltype = AA  length = 9
FEATURE                 Location/Qualifiers
source                  1..9
                        mol_type = protein
                        organism = Gallus gallus
SEQUENCE: 63
IVGAWYTVR                                                       9

SEQ ID NO: 64           moltype = AA  length = 11
FEATURE                 Location/Qualifiers
source                  1..11
                        mol_type = protein
                        organism = Gallus gallus
SEQUENCE: 64
LLSPPGLPGL L                                                    11

SEQ ID NO: 65           moltype = AA  length = 11
FEATURE                 Location/Qualifiers
source                  1..11
                        mol_type = protein
                        organism = Gallus gallus
SEQUENCE: 65
VVVTLPGPIL S                                                    11

SEQ ID NO: 66           moltype = AA  length = 11
FEATURE                 Location/Qualifiers
source                  1..11
                        mol_type = protein
```

```
                        organism = Gallus gallus
SEQUENCE: 66
GFGISGLGSR F                                                      11

SEQ ID NO: 67           moltype = AA  length = 11
FEATURE                 Location/Qualifiers
source                  1..11
                        mol_type = protein
                        organism = Gallus gallus
SEQUENCE: 67
PVVVTLPGPI L                                                      11

SEQ ID NO: 68           moltype = AA  length = 11
FEATURE                 Location/Qualifiers
source                  1..11
                        mol_type = protein
                        organism = Gallus gallus
SEQUENCE: 68
VSQGEITVPS I                                                      11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                      11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                      11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                    13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                    13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                      11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                     12

SEQ ID NO: 75           moltype = AA  length = 11
FEATURE                 Location/Qualifiers
source                  1..11
                        mol_type = protein
                        organism = Gallus gallus
SEQUENCE: 75
PGPILSSFPQ N                                                      11

SEQ ID NO: 76           moltype = AA  length = 11
FEATURE                 Location/Qualifiers
source                  1..11
```

```
                         mol_type = protein
                         organism = Gallus gallus
SEQUENCE: 76
PGPILSSFPQ D                                                11

SEQ ID NO: 77            moltype = AA  length = 12
FEATURE                  Location/Qualifiers
source                   1..12
                         mol_type = protein
                         organism = Gallus gallus
SEQUENCE: 77
GGFGWSGLGR GL                                               12

SEQ ID NO: 78            moltype = AA  length = 12
FEATURE                  Location/Qualifiers
source                   1..12
                         mol_type = protein
                         organism = Gallus gallus
SEQUENCE: 78
PSPVVVTLPG PI                                               12

SEQ ID NO: 79            moltype = AA  length = 12
FEATURE                  Location/Qualifiers
source                   1..12
                         mol_type = protein
                         organism = Gallus gallus
SEQUENCE: 79
VVVTLPGPIL SS                                               12

SEQ ID NO: 80            moltype = AA  length = 12
FEATURE                  Location/Qualifiers
source                   1..12
                         mol_type = protein
                         organism = Gallus gallus
SEQUENCE: 80
PVVVTLPGPI LS                                               12

SEQ ID NO: 81            moltype = AA  length = 12
FEATURE                  Location/Qualifiers
source                   1..12
                         mol_type = protein
                         organism = Gallus gallus
SEQUENCE: 81
SPVVVTLPGP IL                                               12

SEQ ID NO: 82            moltype = AA  length = 11
FEATURE                  Location/Qualifiers
source                   1..11
                         mol_type = protein
                         organism = Gallus gallus
SEQUENCE: 82
RVVIQPSPVV V                                                11

SEQ ID NO: 83            moltype = AA  length = 11
FEATURE                  Location/Qualifiers
source                   1..11
                         mol_type = protein
                         organism = Gallus gallus
SEQUENCE: 83
QALTEVYAKA N                                                11

SEQ ID NO: 84            moltype = AA  length = 10
FEATURE                  Location/Qualifiers
source                   1..10
                         mol_type = protein
                         organism = Gallus gallus
SEQUENCE: 84
IETLTQFLGW                                                  10

SEQ ID NO: 85            moltype = AA  length = 13
FEATURE                  Location/Qualifiers
source                   1..13
                         mol_type = protein
                         organism = Gallus gallus
SEQUENCE: 85
GFGSRSLVGL GGT                                              13

SEQ ID NO: 86            moltype = AA  length = 14
FEATURE                  Location/Qualifiers
```

-continued

```
source                1..14
                      mol_type = protein
                      organism = Gallus gallus
SEQUENCE: 86
AVGSSTSAAV GSIL                                                      14

SEQ ID NO: 87         moltype = AA  length = 12
FEATURE               Location/Qualifiers
source                1..12
                      mol_type = protein
                      organism = Gallus gallus
SEQUENCE: 87
PVVVTFPGPI LS                                                        12

SEQ ID NO: 88         moltype = AA  length = 14
FEATURE               Location/Qualifiers
source                1..14
                      mol_type = protein
                      organism = Gallus gallus
SEQUENCE: 88
VGSSTSAAVG SILS                                                      14

SEQ ID NO: 89         moltype = AA  length = 13
FEATURE               Location/Qualifiers
source                1..13
                      mol_type = protein
                      organism = Gallus gallus
SEQUENCE: 89
GFGISGLGSR FSG                                                       13

SEQ ID NO: 90         moltype = AA  length = 13
FEATURE               Location/Qualifiers
source                1..13
                      mol_type = protein
                      organism = Gallus gallus
SEQUENCE: 90
SGGFGISGLG SRF                                                       13

SEQ ID NO: 91         moltype = AA  length = 14
FEATURE               Location/Qualifiers
source                1..14
                      mol_type = protein
                      organism = Gallus gallus
SEQUENCE: 91
VPISSGGFGI SGLG                                                      14

SEQ ID NO: 92         moltype = AA  length = 12
FEATURE               Location/Qualifiers
source                1..12
                      mol_type = protein
                      organism = Gallus gallus
SEQUENCE: 92
VVIQPSPVVV TL                                                        12

SEQ ID NO: 93         moltype = AA  length = 13
FEATURE               Location/Qualifiers
source                1..13
                      mol_type = protein
                      organism = Gallus gallus
SEQUENCE: 93
SILSEEGVPI SSG                                                       13

SEQ ID NO: 94         moltype = AA  length = 13
FEATURE               Location/Qualifiers
source                1..13
                      mol_type = protein
                      organism = Gallus gallus
SEQUENCE: 94
VMGCKAAGAS RII                                                       13

SEQ ID NO: 95         moltype = AA  length = 13
FEATURE               Location/Qualifiers
source                1..13
                      mol_type = protein
                      organism = Gallus gallus
SEQUENCE: 95
SPVVVTLPGP ILS                                                       13

SEQ ID NO: 96         moltype = AA  length = 12
```

```
FEATURE                Location/Qualifiers
source                 1..12
                       mol_type = protein
                       organism = Gallus gallus
SEQUENCE: 96
SRVVIQPSPV VV                                             12

SEQ ID NO: 97          moltype = AA  length = 13
FEATURE                Location/Qualifiers
source                 1..13
                       mol_type = protein
                       organism = Gallus gallus
SEQUENCE: 97
PSPVVVTLPG PIL                                            13

SEQ ID NO: 98          moltype = AA  length = 12
FEATURE                Location/Qualifiers
source                 1..12
                       mol_type = protein
                       organism = Gallus gallus
SEQUENCE: 98
RVVIQPSPVV VT                                             12

SEQ ID NO: 99          moltype = AA  length = 13
FEATURE                Location/Qualifiers
source                 1..13
                       mol_type = protein
                       organism = Gallus gallus
SEQUENCE: 99
PPPVVVTLPG PIL                                            13

SEQ ID NO: 100         moltype = AA  length = 15
FEATURE                Location/Qualifiers
source                 1..15
                       mol_type = protein
                       organism = Gallus gallus
SEQUENCE: 100
GVPISSGGFG ISGLG                                          15

SEQ ID NO: 101         moltype = AA  length = 13
FEATURE                Location/Qualifiers
source                 1..13
                       mol_type = protein
                       organism = Gallus gallus
SEQUENCE: 101
VIQPSPVVVT LPG                                            13

SEQ ID NO: 102         moltype = AA  length = 15
FEATURE                Location/Qualifiers
source                 1..15
                       mol_type = protein
                       organism = Gallus gallus
SEQUENCE: 102
AVGSSTSAAV GSILS                                          15

SEQ ID NO: 103         moltype = AA  length = 15
FEATURE                Location/Qualifiers
source                 1..15
                       mol_type = protein
                       organism = Gallus gallus
SEQUENCE: 103
TAVGSSTSAA VGSIL                                          15

SEQ ID NO: 104         moltype = AA  length = 14
FEATURE                Location/Qualifiers
source                 1..14
                       mol_type = protein
                       organism = Gallus gallus
SEQUENCE: 104
SGGFGISGLG SRFS                                           14

SEQ ID NO: 105         moltype = AA  length = 13
FEATURE                Location/Qualifiers
source                 1..13
                       mol_type = protein
                       organism = Gallus gallus
SEQUENCE: 105
VVVTLPGPIL SSF                                            13
```

```
SEQ ID NO: 106          moltype = AA  length = 13
FEATURE                 Location/Qualifiers
source                  1..13
                        mol_type = protein
                        organism = Gallus gallus
SEQUENCE: 106
PPPVVVTFPG PIL                                                      13

SEQ ID NO: 107          moltype = AA  length = 14
FEATURE                 Location/Qualifiers
source                  1..14
                        mol_type = protein
                        organism = Gallus gallus
SEQUENCE: 107
GLGGFGWSGL GRGL                                                     14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                      13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                     14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                     14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                     14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                      13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                    15

SEQ ID NO: 114          moltype = AA  length = 14
FEATURE                 Location/Qualifiers
source                  1..14
                        mol_type = protein
                        organism = Gallus gallus
SEQUENCE: 114
PPPVVVTLPG PILS                                                     14

SEQ ID NO: 115          moltype = AA  length = 14
FEATURE                 Location/Qualifiers
source                  1..14
                        mol_type = protein
                        organism = Gallus gallus
SEQUENCE: 115
VAIQPPPVVV TLPG                                                     14
```

```
SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                      15

SEQ ID NO: 117          moltype = AA  length = 13
FEATURE                 Location/Qualifiers
source                  1..13
                        mol_type = protein
                        organism = Gallus gallus
SEQUENCE: 117
PIVDVAEALL HVK                                                        13

SEQ ID NO: 118          moltype = AA  length = 14
FEATURE                 Location/Qualifiers
source                  1..14
                        mol_type = protein
                        organism = Gallus gallus
SEQUENCE: 118
VVIQPSPVVV TLPG                                                       14

SEQ ID NO: 119          moltype = AA  length = 13
FEATURE                 Location/Qualifiers
source                  1..13
                        mol_type = protein
                        organism = Gallus gallus
SEQUENCE: 119
RVVIQPSPVV VTL                                                        13

SEQ ID NO: 120          moltype = AA  length = 16
FEATURE                 Location/Qualifiers
source                  1..16
                        mol_type = protein
                        organism = Gallus gallus
SEQUENCE: 120
TAVGSSTSAA VGSILS                                                     16

SEQ ID NO: 121          moltype = AA  length = 14
FEATURE                 Location/Qualifiers
source                  1..14
                        mol_type = protein
                        organism = Gallus gallus
SEQUENCE: 121
PPPVVVTFPG PILS                                                       14

SEQ ID NO: 122          moltype = AA  length = 15
FEATURE                 Location/Qualifiers
source                  1..15
                        mol_type = protein
                        organism = Gallus gallus
SEQUENCE: 122
SLGLGGFGWS GLGRG                                                      15

SEQ ID NO: 123          moltype = AA  length = 14
FEATURE                 Location/Qualifiers
source                  1..14
                        mol_type = protein
                        organism = Gallus gallus
SEQUENCE: 123
VVVTLPGPIL SSFP                                                       14

SEQ ID NO: 124          moltype = AA  length = 14
FEATURE                 Location/Qualifiers
source                  1..14
                        mol_type = protein
                        organism = Gallus gallus
SEQUENCE: 124
PVVVTLPGPI LSSF                                                       14

SEQ ID NO: 125          moltype = AA  length = 15
FEATURE                 Location/Qualifiers
source                  1..15
                        mol_type = protein
                        organism = Gallus gallus
SEQUENCE: 125
```

```
AAVGSILSEE GVPIS                                                 15

SEQ ID NO: 126          moltype = AA  length = 15
FEATURE                 Location/Qualifiers
source                  1..15
                        mol_type = protein
                        organism = Gallus gallus
SEQUENCE: 126
SAAVGSILSE EGVPI                                                 15

SEQ ID NO: 127          moltype = AA  length = 16
FEATURE                 Location/Qualifiers
source                  1..16
                        mol_type = protein
                        organism = Gallus gallus
SEQUENCE: 127
EGVPISSGGF GISGLG                                                16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                  14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                 15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                 15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                  14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                  14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                 15

SEQ ID NO: 135          moltype = AA  length = 14
FEATURE                 Location/Qualifiers
source                  1..14
                        mol_type = protein
                        organism = Gallus gallus
```

```
SEQUENCE: 135
RVVIQPSPVV VTLP                                                 14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                               16

SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                                15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                              17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                               16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                              17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                              17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                               16

SEQ ID NO: 144          moltype = AA  length = 19
FEATURE                 Location/Qualifiers
source                  1..19
                        mol_type = protein
                        organism = Gallus gallus
SEQUENCE: 144
SAAVGSSLSA GSVPIGAGG                                            19

SEQ ID NO: 145          moltype = AA  length = 17
FEATURE                 Location/Qualifiers
source                  1..17
                        mol_type = protein
```

```
                        organism = Gallus gallus
SEQUENCE: 145
GVPISSGGFG ISGLGSR                                                 17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                   15

SEQ ID NO: 147          moltype = AA  length = 15
FEATURE                 Location/Qualifiers
source                  1..15
                        mol_type = protein
                        organism = Gallus gallus
SEQUENCE: 147
RVVIQPSPVV VTLPG                                                   15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                   15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                                  16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                                  16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                                  16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                                  16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                                 17

SEQ ID NO: 154          moltype = AA  length = 16
FEATURE                 Location/Qualifiers
source                  1..16
                        mol_type = protein
                        organism = Gallus gallus
SEQUENCE: 154
SRVVIQPSPV VVTLPG                                                  16

SEQ ID NO: 155          moltype = AA  length = 17
FEATURE                 Location/Qualifiers
source                  1..17
```

```
                        mol_type = protein
                        organism = Gallus gallus
SEQUENCE: 155
SILSEEGVPI SSGGFGI                                                17

SEQ ID NO: 156          moltype = AA  length = 16
FEATURE                 Location/Qualifiers
source                  1..16
                        mol_type = protein
                        organism = Gallus gallus
SEQUENCE: 156
PVVVTLPGPI LSSFPQ                                                 16

SEQ ID NO: 157          moltype = AA  length = 16
FEATURE                 Location/Qualifiers
source                  1..16
                        mol_type = protein
                        organism = Gallus gallus
SEQUENCE: 157
RVVIQPSPVV VTLPGP                                                 16

SEQ ID NO: 158          moltype = AA  length = 18
FEATURE                 Location/Qualifiers
source                  1..18
                        mol_type = protein
                        organism = Gallus gallus
SEQUENCE: 158
SAAVGSILSE EGVPISSG                                               18

SEQ ID NO: 159          moltype = AA  length = 16
FEATURE                 Location/Qualifiers
source                  1..16
                        mol_type = protein
                        organism = Gallus gallus
SEQUENCE: 159
VVVTLPGPIL SSFPQN                                                 16

SEQ ID NO: 160          moltype = AA  length = 18
FEATURE                 Location/Qualifiers
source                  1..18
                        mol_type = protein
                        organism = Gallus gallus
SEQUENCE: 160
GVPISSGGFG ISGLGSRF                                               18

SEQ ID NO: 161          moltype = AA  length = 17
FEATURE                 Location/Qualifiers
source                  1..17
                        mol_type = protein
                        organism = Gallus gallus
SEQUENCE: 161
PSPVVVTLPG PILSSFP                                                17

SEQ ID NO: 162          moltype = AA  length = 17
FEATURE                 Location/Qualifiers
source                  1..17
                        mol_type = protein
                        organism = Gallus gallus
SEQUENCE: 162
VAIQPPPVVV TLPGPIL                                                17

SEQ ID NO: 163          moltype = AA  length = 17
FEATURE                 Location/Qualifiers
source                  1..17
                        mol_type = protein
                        organism = Gallus gallus
SEQUENCE: 163
VIQPSPVVVT LPGPILS                                                17

SEQ ID NO: 164          moltype = AA  length = 17
FEATURE                 Location/Qualifiers
source                  1..17
                        mol_type = protein
                        organism = Gallus gallus
SEQUENCE: 164
VVIQPSPVVV TLPGPIL                                                17

SEQ ID NO: 165          moltype = AA  length = 17
FEATURE                 Location/Qualifiers
```

```
source                1..17
                      mol_type = protein
                      organism = Gallus gallus
SEQUENCE: 165
SPVVVTLPGP ILSSFPQ                                                17

SEQ ID NO: 166        moltype = AA  length = 15
FEATURE               Location/Qualifiers
source                1..15
                      mol_type = protein
                      organism = Gallus gallus
SEQUENCE: 166
VILSNTKTQY SIKIH                                                  15

SEQ ID NO: 167        moltype = AA  length = 17
FEATURE               Location/Qualifiers
source                1..17
                      mol_type = protein
                      organism = Gallus gallus
SEQUENCE: 167
SRVVIQPSPV VVTLPGP                                                17

SEQ ID NO: 168        moltype = AA  length = 17
FEATURE               Location/Qualifiers
source                1..17
                      mol_type = protein
                      organism = Gallus gallus
SEQUENCE: 168
DSRVVIQPSP VVVTLPG                                                17

SEQ ID NO: 169        moltype = AA  length = 17
FEATURE               Location/Qualifiers
source                1..17
                      mol_type = protein
                      organism = Gallus gallus
SEQUENCE: 169
PVVVTLPGPI LSSFPQN                                                17

SEQ ID NO: 170        moltype = AA  length = 17
FEATURE               Location/Qualifiers
source                1..17
                      mol_type = protein
                      organism = Gallus gallus
SEQUENCE: 170
RVVIQPSPVV VTLPGPI                                                17

SEQ ID NO: 171        moltype = AA  length = 19
FEATURE               Location/Qualifiers
source                1..19
                      mol_type = protein
                      organism = Gallus gallus
SEQUENCE: 171
GVPISSGGFG ISGLGSRFS                                              19

SEQ ID NO: 172        moltype = AA  length = 18
FEATURE               Location/Qualifiers
source                1..18
                      mol_type = protein
                      organism = Gallus gallus
SEQUENCE: 172
SVAIQPPPVV VTLPGPIL                                               18

SEQ ID NO: 173        moltype = AA  length = 18
FEATURE               Location/Qualifiers
source                1..18
                      mol_type = protein
                      organism = Gallus gallus
SEQUENCE: 173
VAIQPPPVVV TLPGPILS                                               18

SEQ ID NO: 174        moltype = AA  length = 18
FEATURE               Location/Qualifiers
source                1..18
                      mol_type = protein
                      organism = Gallus gallus
SEQUENCE: 174
VVIQPSPVVV TLPGPILS                                               18

SEQ ID NO: 175        moltype = AA  length = 18
```

```
FEATURE                 Location/Qualifiers
source                  1..18
                        mol_type = protein
                        organism = Gallus gallus
SEQUENCE: 175
PSPVVVTLPG PILSSFPQ                                                18

SEQ ID NO: 176          moltype = AA  length = 20
FEATURE                 Location/Qualifiers
source                  1..20
                        mol_type = protein
                        organism = Gallus gallus
SEQUENCE: 176
GVPISSGGFG ISGLGSRFSG                                              20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                                18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                                18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                                18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                                18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                                18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                               19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                               19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                                18
```

```
SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                           19

SEQ ID NO: 186          moltype = AA  length = 21
FEATURE                 Location/Qualifiers
source                  1..21
                        mol_type = protein
                        organism = Gallus gallus
SEQUENCE: 186
SILSEEGVPI SSGGFGISGL G                                        21

SEQ ID NO: 187          moltype = AA  length = 19
FEATURE                 Location/Qualifiers
source                  1..19
                        mol_type = protein
                        organism = Gallus gallus
SEQUENCE: 187
SRVVIQPSPV VVTLPGPIL                                           19

SEQ ID NO: 188          moltype = AA  length = 19
FEATURE                 Location/Qualifiers
source                  1..19
                        mol_type = protein
                        organism = Gallus gallus
SEQUENCE: 188
RVVIQPSPVV VTLPGPILS                                           19

SEQ ID NO: 189          moltype = AA  length = 22
FEATURE                 Location/Qualifiers
source                  1..22
                        mol_type = protein
                        organism = Gallus gallus
SEQUENCE: 189
SVPIGAGGSL GLGGFGWSGL GR                                       22

SEQ ID NO: 190          moltype = AA  length = 22
FEATURE                 Location/Qualifiers
source                  1..22
                        mol_type = protein
                        organism = Gallus gallus
SEQUENCE: 190
TAVGSSTSAA VGSILSEEGV PI                                       22

SEQ ID NO: 191          moltype = AA  length = 22
FEATURE                 Location/Qualifiers
source                  1..22
                        mol_type = protein
                        organism = Gallus gallus
SEQUENCE: 191
SAAVGSILSE EGVPISSGGF GI                                       22

SEQ ID NO: 192          moltype = AA  length = 21
FEATURE                 Location/Qualifiers
source                  1..21
                        mol_type = protein
                        organism = Gallus gallus
SEQUENCE: 192
SEEGVPISSG GFGISGLGSR F                                        21

SEQ ID NO: 193          moltype = AA  length = 20
FEATURE                 Location/Qualifiers
source                  1..20
                        mol_type = protein
                        organism = Gallus gallus
SEQUENCE: 193
SRVVIQPSPV VVTLPGPILS                                          20

SEQ ID NO: 194          moltype = AA  length = 23
FEATURE                 Location/Qualifiers
source                  1..23
                        mol_type = protein
                        organism = Gallus gallus
SEQUENCE: 194
SVPIGAGGSL GLGGFGWSGL GRG                                      23
```

```
SEQ ID NO: 195         moltype = AA  length = 20
FEATURE                Location/Qualifiers
source                 1..20
                       mol_type = protein
                       organism = Gallus gallus
SEQUENCE: 195
DSRVVIQPSP VVVTLPGPIL                                              20

SEQ ID NO: 196         moltype = AA  length = 23
FEATURE                Location/Qualifiers
source                 1..23
                       mol_type = protein
                       organism = Gallus gallus
SEQUENCE: 196
TAVGSSTSAA VGSILSEEGV PIS                                          23

SEQ ID NO: 197         moltype = AA  length = 22
FEATURE                Location/Qualifiers
source                 1..22
                       mol_type = protein
                       organism = Gallus gallus
SEQUENCE: 197
LRGDVGPVGR TGEQGIAGPP GF                                           22

SEQ ID NO: 198         moltype = AA  length = 21
FEATURE                Location/Qualifiers
source                 1..21
                       mol_type = protein
                       organism = Gallus gallus
SEQUENCE: 198
SRVVIQPSPV VVTLPGPILS S                                            21

SEQ ID NO: 199         moltype = AA  length = 21
FEATURE                Location/Qualifiers
source                 1..21
                       mol_type = protein
                       organism = Gallus gallus
SEQUENCE: 199
VVIQPSPVVV TLPGPILSSF P                                            21

SEQ ID NO: 200         moltype = AA  length = 22
FEATURE                Location/Qualifiers
source                 1..22
                       mol_type = protein
                       organism = Gallus gallus
SEQUENCE: 200
GVPISSGGFG ISGLGSRFSG RR                                           22

SEQ ID NO: 201         moltype = AA  length = 24
FEATURE                Location/Qualifiers
source                 1..24
                       mol_type = protein
                       organism = Gallus gallus
SEQUENCE: 201
SVPIGAGGSL GLGGFGWSGL GRGL                                         24

SEQ ID NO: 202         moltype = AA  length = 21
FEATURE                Location/Qualifiers
source                 1..21
                       mol_type = protein
                       organism = Gallus gallus
SEQUENCE: 202
DSRVVIQPSP VVVTLPGPIL S                                            21

SEQ ID NO: 203         moltype = AA  length = 21
FEATURE                Location/Qualifiers
source                 1..21
                       mol_type = protein
                       organism = Gallus gallus
SEQUENCE: 203
VIQPSPVVVT LPGPILSSFP Q                                            21

SEQ ID NO: 204         moltype = AA  length = 24
FEATURE                Location/Qualifiers
source                 1..24
                       mol_type = protein
                       organism = Gallus gallus
SEQUENCE: 204
```

```
AVGSILSEEG VPISSGGFGI SGLG                                          24

SEQ ID NO: 205         moltype = AA  length = 21
FEATURE                Location/Qualifiers
source                 1..21
                       mol_type = protein
                       organism = Gallus gallus
SEQUENCE: 205
RVVIQPSPVV VTLPGPILSS F                                             21

SEQ ID NO: 206         moltype = AA  length = 23
FEATURE                Location/Qualifiers
source                 1..23
                       mol_type = protein
                       organism = Gallus gallus
SEQUENCE: 206
SILSEEGVPI SSGGFGISGL GSR                                           23

SEQ ID NO: 207         moltype = AA  length = 21
FEATURE                Location/Qualifiers
source                 1..21
                       mol_type = protein
                       organism = Gallus gallus
SEQUENCE: 207
IPSSVPESSF KIKGNSSSFH I                                             21

SEQ ID NO: 208         moltype = AA  length = 22
FEATURE                Location/Qualifiers
source                 1..22
                       mol_type = protein
                       organism = Gallus gallus
SEQUENCE: 208
VAIQPPPVVV TLPGPILSSF PQ                                            22

SEQ ID NO: 209         moltype = AA  length = 25
FEATURE                Location/Qualifiers
source                 1..25
                       mol_type = protein
                       organism = Gallus gallus
SEQUENCE: 209
TAVGSSTSAA VGSILSEEGV PISSG                                         25

SEQ ID NO: 210         moltype = AA  length = 22
FEATURE                Location/Qualifiers
source                 1..22
                       mol_type = protein
                       organism = Gallus gallus
SEQUENCE: 210
VVIQPSPVVV TLPGPILSSF PQ                                            22

SEQ ID NO: 211         moltype = AA  length = 23
FEATURE                Location/Qualifiers
source                 1..23
                       mol_type = protein
                       organism = Gallus gallus
SEQUENCE: 211
PSPVVVTLPG PILSSFPQNT AVG                                           23

SEQ ID NO: 212         moltype = AA  length = 20
FEATURE                Location/Qualifiers
source                 1..20
                       mol_type = protein
                       organism = Gallus gallus
SEQUENCE: 212
KENFEVLCKD GTRKPVTDAE                                               20

SEQ ID NO: 213         moltype = AA  length = 21
FEATURE                Location/Qualifiers
source                 1..21
                       mol_type = protein
                       organism = Gallus gallus
SEQUENCE: 213
SIQACKLAQS HGWGVMVSHR S                                             21

SEQ ID NO: 214         moltype = AA  length = 22
FEATURE                Location/Qualifiers
source                 1..22
                       mol_type = protein
                       organism = Gallus gallus
```

```
SEQUENCE: 214
SRVVIQPSPV VVTLPGPILS SF                                            22

SEQ ID NO: 215          moltype = AA  length = 22
FEATURE                 Location/Qualifiers
source                  1..22
                        mol_type = protein
                        organism = Gallus gallus
SEQUENCE: 215
RVVIQPSPVV VTLPGPILSS FP                                            22

SEQ ID NO: 216          moltype = AA  length = 23
FEATURE                 Location/Qualifiers
source                  1..23
                        mol_type = protein
                        organism = Gallus gallus
SEQUENCE: 216
EQPPLCVASV SVKEPASETP AVP                                           23

SEQ ID NO: 217          moltype = AA  length = 23
FEATURE                 Location/Qualifiers
source                  1..23
                        mol_type = protein
                        organism = Gallus gallus
SEQUENCE: 217
SVAIQPPPVV VTLPGPILSS FPQ                                           23

SEQ ID NO: 218          moltype = AA  length = 26
FEATURE                 Location/Qualifiers
source                  1..26
                        mol_type = protein
                        organism = Gallus gallus
SEQUENCE: 218
SAAVGSILSE EGVPISSGGF GISGLG                                        26

SEQ ID NO: 219          moltype = AA  length = 24
FEATURE                 Location/Qualifiers
source                  1..24
                        mol_type = protein
                        organism = Gallus gallus
SEQUENCE: 219
SILSEEGVPI SSGGFGISGL GSRF                                          24

SEQ ID NO: 220          moltype = AA  length = 24
FEATURE                 Location/Qualifiers
source                  1..24
                        mol_type = protein
                        organism = Gallus gallus
SEQUENCE: 220
PSPVVVTLPG PILSSFPQNT AVGS                                          24

SEQ ID NO: 221          moltype = AA  length = 23
FEATURE                 Location/Qualifiers
source                  1..23
                        mol_type = protein
                        organism = Gallus gallus
SEQUENCE: 221
VVIQPSPVVV TLPGPILSSF PQN                                           23

SEQ ID NO: 222          moltype = AA  length = 23
FEATURE                 Location/Qualifiers
source                  1..23
                        mol_type = protein
                        organism = Gallus gallus
SEQUENCE: 222
SRVVIQPSPV VVTLPGPILS SFP                                           23

SEQ ID NO: 223          moltype = AA  length = 24
FEATURE                 Location/Qualifiers
source                  1..24
                        mol_type = protein
                        organism = Gallus gallus
SEQUENCE: 223
SSVAIQPPPV VVTLPGPILS SFPQ                                          24

SEQ ID NO: 224          moltype = AA  length = 23
FEATURE                 Location/Qualifiers
source                  1..23
                        mol_type = protein
```

```
                        organism = Gallus gallus
SEQUENCE: 224
RVVIQPSPVV VTLPGPILSS FPQ                                              23

SEQ ID NO: 225          moltype = AA  length = 25
FEATURE                 Location/Qualifiers
source                  1..25
                        mol_type = protein
                        organism = Gallus gallus
SEQUENCE: 225
SILSEEGVPI SSGGFGISGL GSRFS                                            25

SEQ ID NO: 226          moltype = AA  length = 27
FEATURE                 Location/Qualifiers
source                  1..27
                        mol_type = protein
                        organism = Gallus gallus
SEQUENCE: 226
TSAAVGSILS EEGVPISSGG FGISGLG                                          27

SEQ ID NO: 227          moltype = AA  length = 26
FEATURE                 Location/Qualifiers
source                  1..26
                        mol_type = protein
                        organism = Gallus gallus
SEQUENCE: 227
SILSEEGVPI SSGGFGISGL GSRFSG                                           26

SEQ ID NO: 228          moltype = AA  length = 24
FEATURE                 Location/Qualifiers
source                  1..24
                        mol_type = protein
                        organism = Gallus gallus
SEQUENCE: 228
SRVVIQPSPV VVTLPGPILS SFPQ                                             24

SEQ ID NO: 229          moltype = AA  length = 28
FEATURE                 Location/Qualifiers
source                  1..28
                        mol_type = protein
                        organism = Gallus gallus
SEQUENCE: 229
TAVGSSTSAA VGSILSEEGV PISSGGFG                                         28

SEQ ID NO: 230          moltype = AA  length = 28
FEATURE                 Location/Qualifiers
source                  1..28
                        mol_type = protein
                        organism = Gallus gallus
SEQUENCE: 230
STSAAVGSIL SEEGVPISSG GFGISGLG                                         28

SEQ ID NO: 231          moltype = AA  length = 24
FEATURE                 Location/Qualifiers
source                  1..24
                        mol_type = protein
                        organism = Gallus gallus
SEQUENCE: 231
RVVIQPSPVV VTLPGPILSS FPQN                                             24

SEQ ID NO: 232          moltype = AA  length = 25
FEATURE                 Location/Qualifiers
source                  1..25
                        mol_type = protein
                        organism = Gallus gallus
SEQUENCE: 232
SRVVIQPSPV VVTLPGPILS SFPQN                                            25

SEQ ID NO: 233          moltype = AA  length = 25
FEATURE                 Location/Qualifiers
source                  1..25
                        mol_type = protein
                        organism = Gallus gallus
SEQUENCE: 233
DSRVVIQPSP VVVTLPGPIL SSFPQ                                            25

SEQ ID NO: 234          moltype = AA  length = 29
FEATURE                 Location/Qualifiers
source                  1..29
```

```
                        mol_type = protein
                        organism = Gallus gallus
SEQUENCE: 234
TAVGSSTSAA VGSILSEEGV PISSGGFGI                                       29

SEQ ID NO: 235          moltype = AA  length = 29
FEATURE                 Location/Qualifiers
source                  1..29
                        mol_type = protein
                        organism = Gallus gallus
SEQUENCE: 235
SAAVGSILSE EGVPISSGGF GISGLGSRF                                       29

SEQ ID NO: 236          moltype = AA  length = 24
FEATURE                 Location/Qualifiers
source                  1..24
                        mol_type = protein
                        organism = Gallus gallus
SEQUENCE: 236
VEQLVNLQHL DVAYNLLLEH AQLA                                            24

SEQ ID NO: 237          moltype = AA  length = 28
FEATURE                 Location/Qualifiers
source                  1..28
                        mol_type = protein
                        organism = Gallus gallus
SEQUENCE: 237
SVAIQPPPVV VTLPGPILSS FPQSTAVG                                        28

SEQ ID NO: 238          moltype = AA  length = 28
FEATURE                 Location/Qualifiers
source                  1..28
                        mol_type = protein
                        organism = Gallus gallus
SEQUENCE: 238
SILSEEGVPI SSGGFGISGL GSRFSGRR                                        28

SEQ ID NO: 239          moltype = AA  length = 30
FEATURE                 Location/Qualifiers
source                  1..30
                        mol_type = protein
                        organism = Gallus gallus
SEQUENCE: 239
TSAAVGSILS EEGVPISSGG FGISGLGSRF                                      30

SEQ ID NO: 240          moltype = AA  length = 29
FEATURE                 Location/Qualifiers
source                  1..29
                        mol_type = protein
                        organism = Gallus gallus
SEQUENCE: 240
SSVAIQPPPV VVTLPGPILS SFPQSTAVG                                       29

SEQ ID NO: 241          moltype = AA  length = 31
FEATURE                 Location/Qualifiers
source                  1..31
                        mol_type = protein
                        organism = Gallus gallus
SEQUENCE: 241
STSAAVGSIL SEEGVPISSG GFGISGLGSR F                                    31

SEQ ID NO: 242          moltype = AA  length = 31
FEATURE                 Location/Qualifiers
source                  1..31
                        mol_type = protein
                        organism = Gallus gallus
SEQUENCE: 242
PSPVVVTLPG PILSSFPQNT AVGSSTSAAV G                                    31

SEQ ID NO: 243          moltype = AA  length = 33
FEATURE                 Location/Qualifiers
source                  1..33
                        mol_type = protein
                        organism = Gallus gallus
SEQUENCE: 243
TAVGSSTSAA VGSILSEEGV PISSGGFGIS GLG                                  33

SEQ ID NO: 244          moltype = AA  length = 31
FEATURE                 Location/Qualifiers
```

```
source                  1..31
                        mol_type = protein
                        organism = Gallus gallus
SEQUENCE: 244
AVGSILSEEG VPISSGGFGI SGLGSRFSGR R                                  31

SEQ ID NO: 245          moltype = AA  length = 27
FEATURE                 Location/Qualifiers
source                  1..27
                        mol_type = protein
                        organism = Gallus gallus
SEQUENCE: 245
NKVLVHCAMG RSRSATLVLA YLMIYKN                                       27

SEQ ID NO: 246          moltype = AA  length = 32
FEATURE                 Location/Qualifiers
source                  1..32
                        mol_type = protein
                        organism = Gallus gallus
SEQUENCE: 246
SSVAIQPPPV VVTLPGPILS SFPQSTAVGS TA                                 32

SEQ ID NO: 247          moltype = AA  length = 32
FEATURE                 Location/Qualifiers
source                  1..32
                        mol_type = protein
                        organism = Gallus gallus
SEQUENCE: 247
AAVGSILSEE GVPISSGGFG ISGLGSRFSG RR                                 32

SEQ ID NO: 248          moltype = AA  length = 35
FEATURE                 Location/Qualifiers
source                  1..35
                        mol_type = protein
                        organism = Gallus gallus
SEQUENCE: 248
TAVGSSTSAA VGSILSEEGV PISSGGFGIS GLGSR                              35

SEQ ID NO: 249          moltype = AA  length = 33
FEATURE                 Location/Qualifiers
source                  1..33
                        mol_type = protein
                        organism = Gallus gallus
SEQUENCE: 249
SAAVGSILSE EGVPISSGGF GISGLGSRFS GRR                                33

SEQ ID NO: 250          moltype = AA  length = 34
FEATURE                 Location/Qualifiers
source                  1..34
                        mol_type = protein
                        organism = Gallus gallus
SEQUENCE: 250
PSPVVVTLPG PILSSFPQNT AVGSSTSAAV GSIL                               34

SEQ ID NO: 251          moltype = AA  length = 35
FEATURE                 Location/Qualifiers
source                  1..35
                        mol_type = protein
                        organism = Gallus gallus
SEQUENCE: 251
PSPVVVTLPG PILSSFPQNT AVGSSTSAAV GSILS                              35

SEQ ID NO: 252          moltype = AA  length = 36
FEATURE                 Location/Qualifiers
source                  1..36
                        mol_type = protein
                        organism = Gallus gallus
SEQUENCE: 252
TAVGSSTSAA VGSILSEEGV PISSGGFGIS GLGSRF                             36

SEQ ID NO: 253          moltype = AA  length = 29
FEATURE                 Location/Qualifiers
source                  1..29
                        mol_type = protein
                        organism = Gallus gallus
SEQUENCE: 253
RPRVYLHCTN PRHPKYREGD VTLFALNLS                                     29
```

METHOD OF USING/APPLYING A KERATIN HYDROLYSIS PEPTIDE SOLUTION TO PROMOTE SOYBEAN GROWTH UNDER LOW LIGHT CONDITION

PRIORITY CLAIM TO FOREIGN APPLICATION

Applicant hereby makes priority claim to a Taiwan application, number 112144620, having the Taiwan filing date of Nov. 17, 2023.

SEQUENCE LISTING

The instant application contains a Sequence Listing which has been submitted electronically in XML format and is hereby incorporated by reference in its entirety. Said XML copy, created on Mar. 17, 2024, is named Table-I-253_sequence and is 216 bytes in size.

BACKGROUND OF THE INVENTION

Present invention disclosed and claimed the method and application of a keratin hydrolysis peptide ("KHP") solution to promote the growth of soybeans under low light conditions.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The KHP solution is made by a hydrolysis process using feathers and water, via a high-temperature and high-pressure process, resulting in a solution that has many beneficial applications in the fields of horticulture, agriculture and potentially other farming businesses.

Among the embodiments disclosed and claimed in this application, one specific embodiment used feathers only, without water, to be treated with the high-temperature and high-pressure process as taught herein to produce a specific version of the KHP

Solution

Soybean (scientific name: *Glycine max* L. *Merr.*) is an important part of global agricultural businesses; not only is it a staple food, it also is a base for various industrial products. Soybean originated from the Northeastern part of China, with over 5,000 years of cultivation history. The farming and growing of soybeans has spread globally over the past few centuries. The ten major soybean producing countries are Brazil, U.S.A., Argentina, China, India, Paraguay, Canada, Russia, Ukraine, and Bolivia.

In the U.S.A., mid-Western states are the major soybean farming regions, especially the two states of Illinois and Iowa. In Taiwan, the soybean farming regions include Changhua, Yunlin, Jiayi, Tainan, Kaohsiung, Pingtung, Hualian and Taitung.

The worldwide production reached 320 million tons in 2020, having value in excess of $105 billion U.S. dollars. The top five worldwide producers are Brazil (34%), U.S.A. (32%), Argentina (13.8%), China (5.5.%) and India (3.2%). In terms of production value, the rankings are: U.S.A. ($47 billion dollars), Brazil ($32.8 billion dollars), China ($15.1 billion), Paraguay ($3.3 billion) and Canada ($2.2 billion). Taiwan's soybean production amount ranged from 4,400-4,800 metric tons a year and ranked 73 in the world in 2020.

Soybean contains 20% fat and 40% protein; it is an excellent source of protein and a source material for plant-based cooking oil. Globally, food products made from soybeans and crushed-soybean derivative materials increased more than two-folds in the past 20 years. It is reasonably expected that the demand for more soybean, as well as the quality soybean-based derivative products, will increase substantially.

Soybean has strong light-affinity; sufficient exposure to lighting is necessary for the photosynthetic activities and the nutritional development of soybean plants. Generally, the light saturation point is around 30,000-40,000 lux, while some higher measurement of 60,000 lux is also reported.

In recent years, the climate changes cause the soybean's growth to experience some undesirable low light exposure that negatively impacted the growth of soybean, and consequently, the production yield. The low light conditions, brought on by overcast sky, smoggy air, and the incidental canopy effect of high-density vegetation practice, reduces the light exposure needed by soybean, leading to decreased photosynthesis and carbohydrate production of the soybean plants and the downturn of the plant health overall.

The present invention's KHP solution and the method of using same is a cost-effective way to improve the growth of soybeans when the adverse low light conditions may be present by infusing the solution to the soil where soybeans are sown, and where the young seedlings are sprouting, or by leaf spraying the soybean during the first growth period of soybean plants.

The inventors of present application conducted numerous tests and confirmed the effectiveness of applying the KHP solution as disclosed and claimed herein.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of Pogostemon cablin and Vigna radiata, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher-pressure setting, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used the Dionex UltiMate 3000 UPLC to separate the peptides; an analysis is done via Thermo Orbitrap Fushion Lumos Tribrid Orbitrap mass spectrometry to identify the peptides, which are then subsequently confirmed by looking up the BIOPEP-UWM database.

The solutions are infused to the soil containing the soybean seeds; at seedling stage, the solutions can also be applied. Alternatively, the solutions can be sprayed to the leaf surface of the soybean plants.

The solution can be diluted by water, at 50 to 500 ratio (denoted as 50×, 500×) by volume, and then applied to the soil containing the lettuce plants, and sprayed to the lettuce plant's leaves.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

DETAILED DESCRIPTION OF THE INVENTION

Figure 1:
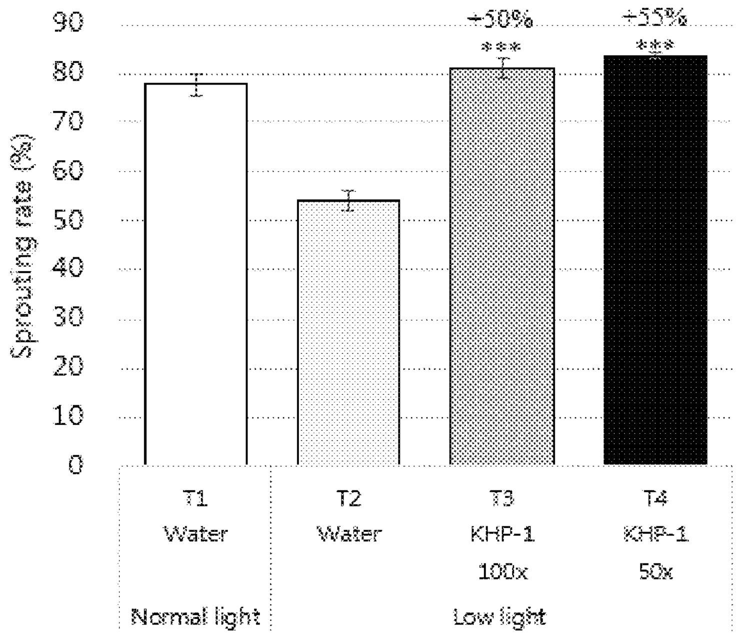
FIG. 1 shows the comparison of soybean sprouting rates among the 3 groups (T2, T3 and T4) under low light conditions, compared to the normal light group (T1).

The keratin hydrolysis peptide ("KHP") solution of present invention is made by a high-temperature and high-pressure process to treat a mixture of water and feathers as shown in the parameters herein.

The mixture ratio, temperature, pressure and duration parameters are shown herein:

| | Feather (kg) | Water (kg) | Water content in feather (%) | Pressure (kg/cm$^2$) | Temp. (°C) | Time (min) | Mass (Da) | Concen. (ppm) |
|---|---|---|---|---|---|---|---|---|
| 1 | 70 | 0 | 46% | 13 | 180 | 40 | 705.9~3194.7 | 381250 |
| 2 | 66 | 44 | 50% | 16 | 195 | 40 | 593.3~3828.0 | 200000 |
| 3 | 50 | 40 | 50% | 12 | 185 | 80 | 593.3~3508.9 | 301500 |

A first embodiment of keratin hydrolysis peptide (KHP) solution, without water, can be made by 70 kg of feathers, with the feathers' water content being 46%, and then treated by the steps of:

a. stirring the feathers in a sealed container;
b. hydrolyzing the feathers in the container with a temperature and pressure setting of 180 °C and 13 kg/cm$^2$ for a duration of 40 minutes;
c. using a mass spectrometer to confirm the combination of peptides in the solution to contain at least 253 peptides as listed in the specification whereby their molecular masses are between 705.9 and 3,194.7 Dalton.

The keratin hydrolysis peptide (KHP) solution of the first embodiment is further filtered and concentrated to 381,250 ppm concentration.

The hydrolysis process in the second embodiment takes the steps of:

a. Preparing the KHP solution by mixing 66 kg of feathers whose content is 50% water and 44 kg of water in a sealed container;
b. hydrolyzing the mixture in the container with a temperature and pressure setting of 195 °C and 16 kg/cm$^2$ for a duration of 40 minutes;
c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm, and The hydrolysis process in the third embodiment takes the steps of:

a. Preparing the KHP solution by mixing 50 kg of feathers whose content is 50% water with 40 kg of water in a sealed container;
b. hydrolyzing the mixture in the container with a temperature and pressure setting of 185 °C and 12 kg/cm$^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm;

The confirmation of some of the 253 peptides is further done by referencing the BIOPEP-UWM database.

The method of using a keratin hydrolysis peptide (KHP) solution is by infusing the solution to the soil containing the soybean seeds or the young seedlings. Alternatively, the KHP solution can also be leaf-sprayed to the young seedlings of the soybean plants.

The method stated above can be done by the KHP solution diluted with water by volume at the ratio of 1:50-500 for infusing to the soil containing the soybean seeds or young seedlings or for leaf spraying to the soybean plants.

The inventors conducted different tests, in controlled rooms and in the field, by defining certain growth conditions and groups.

Two sets of light exposure are provided herein:

| Light Group | Illumination (mmole/$m^2\cdot s$) | Intensity |
|---|---|---|
| Normal setting | 600 | 100% |
| Low light setting | 300 | 50% |

Four (4) groups are provided to compare the results of KHP solutions infused into the soil containing soybean seeds or seedlings.

| Group | Setting | Solution applied | Dilution |
|---|---|---|---|
| T1 | Normal setting | water | — |
| T2 | Low light setting | water | — |
| T3 | | KHP-1 | 100x |
| T4 | | KHP-1 | 50x |

The comparison among the four (4) groups show different growth and measurement indicators to prove the effectiveness of the KHP solution applications as taught herein.

In FIG. 1, the comparison will show that, in low light setting, the sprouting/germination rate (in T2 group) is worse than the natural lighting group (T1 group). But when KHP solutions are applied, at 100× and 50× dilution ratios, the sprouting/germination greatly improved and even surpassed the rate in T1 normal light setting. The 13 group (KHP-1 100×) shows 50% increase of sprouting rate over that of the T2 group; the T4 group (KHP-1 50×) shows 55% increase of sprouting rate over that of the T2 group.

On the 14$^{th}$ day after infusion, seven soybean plants from each group were selected to take photos, for observation and measurements. Specifically, the leaf area and above-ground dry weights are compared, to show the KHP solutions' effect.

Figure 2A:
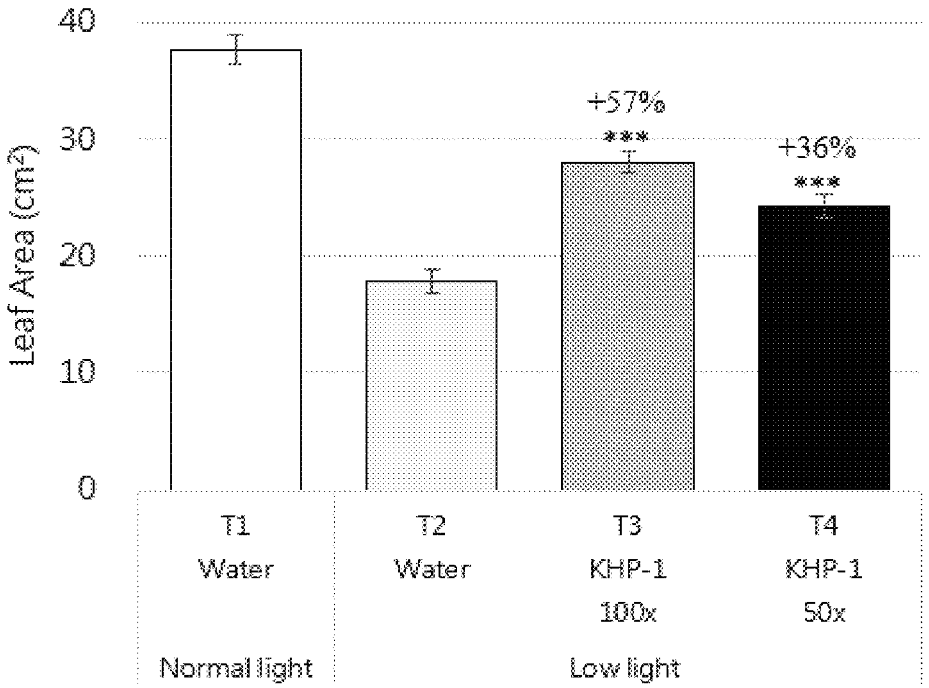
FIG. 2A shows the comparison of leaf area of the 3 groups (T2, T3 and T4) under low light conditions, compared to the normal light group (T1).

FIG. 2A clearly shows that the low light T2 group's leaf area is smaller than the normal lighting T1 group. But with the application of KHP-1 100× (T3) and KHP-1 50× (T4), the leaf areas are 1 0.57 times and 1 36 times, respectively, that of the T2 group.

Figure 2B:
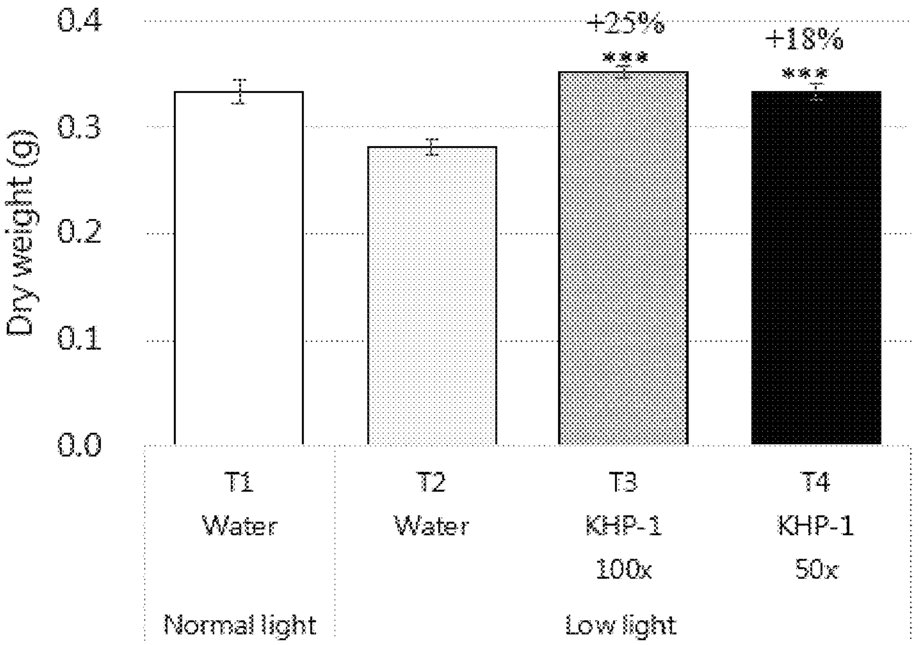
FIG. 2B shows the comparison of above-ground dry weights of the 3 low-light groups (T2, T3 and T4), compared to the normal light group (T1).

FIG. 2B shows the dry weight comparison where the T2 group performed worse than the T1 normal light group. But with the application of KHP-1 100× (T3) and KHP-1 50× (T4), the dry weights (above ground portion) are 1.25 times and 1.18 times, respectively, that of the T2 group.

Figure 3A:
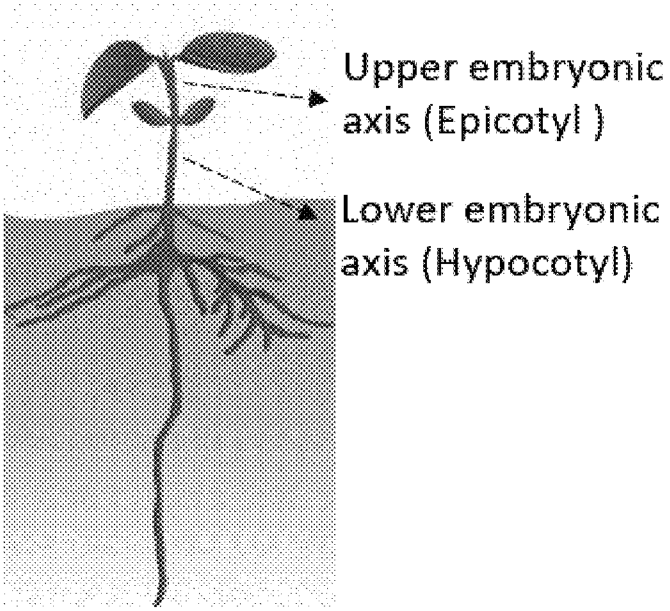
FIG. 3A identified the two measurement points for comparing soybean growth status; and epicotyl and hypocotyl.

The KHP solutions' boost to the main stem of soybean plant, under low light condition, is assessed by measuring the epicotyl width and the hypocotyl width as shown in FIG. 3A.

Figure 3B:
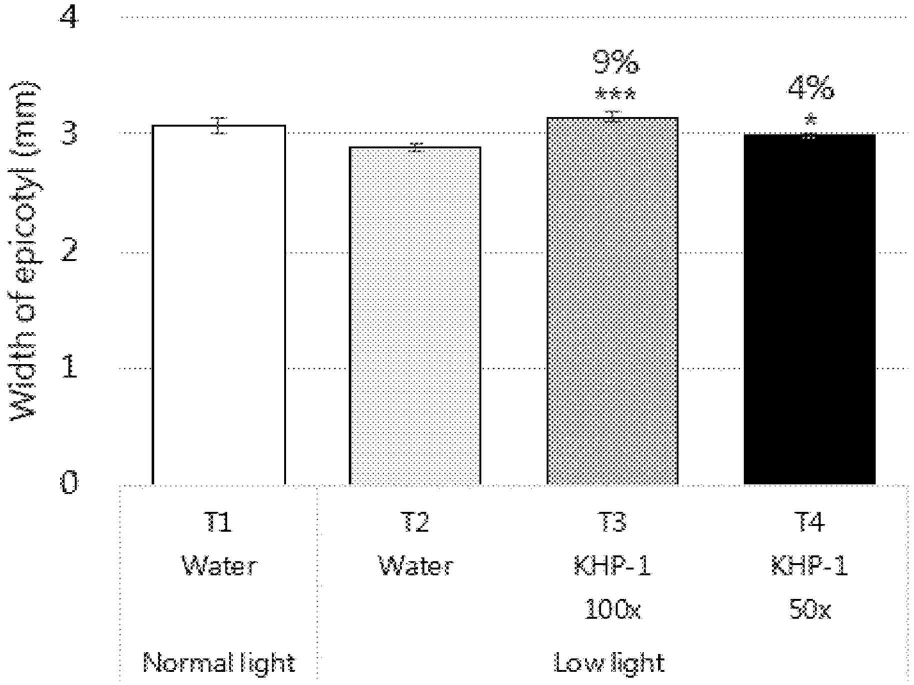
FIG. 3B shows the comparison of the widths of the epicotyl of 3 low-light groups (T2, T3 and T4), compared to that of the normal light group (T1).

From FIG. 3B, the low light group (T2) has smaller epicotyl width than that of the normal lighting group (T1). But with the application of KHP-1 100× and KHP-1 50× solutions, the epicotyl widths are 1.09 times (T3) and 1.04 times (T4), respectively, that of the T2 group.

Figure 3C:
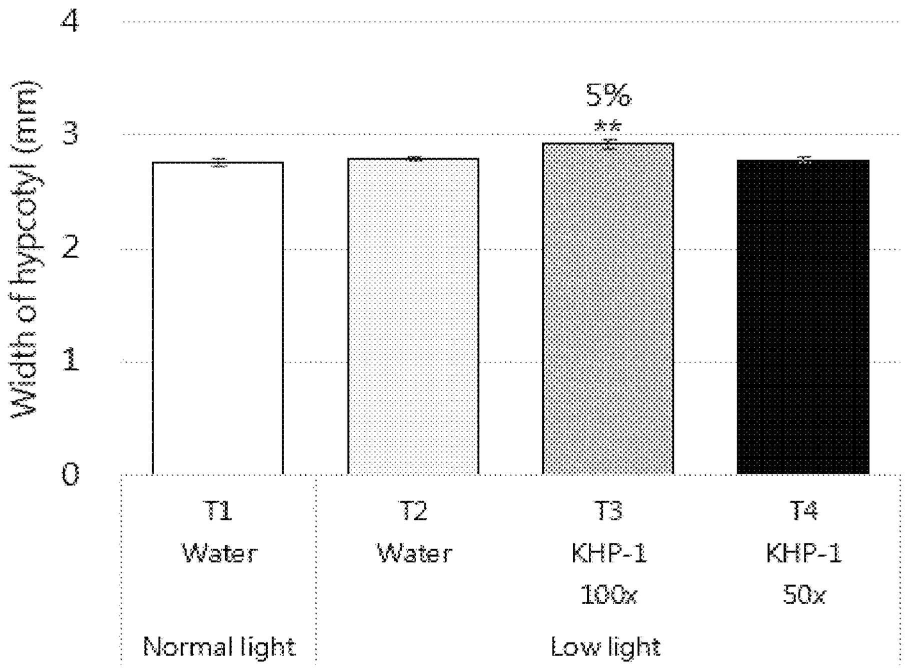
FIG. 3C shows the comparison of the widths of the hypocotyl of the 3 low-light groups (T2, T3 and T4), compared to that of the normal light group (T1).

FIG. 3C shows that the KHP-1 100× solution (T3 group) boosted the hypocotyl width to be 1.05 times of that of the normal (T1) group. The KHP-1 50× group (T4) did not show observable improvement over the T2 group.

Figure 4A:
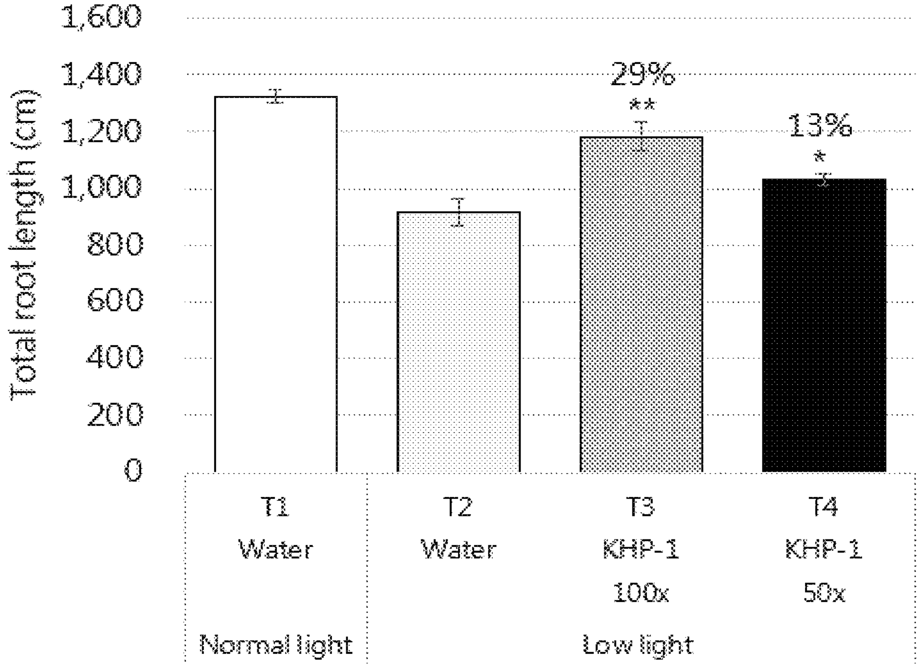
FIG. 4A shows the comparison of the root lengths of the 3 low-light groups (T2, T3 and T4), compared to that of the normal light group (T1).
Figure 4B:
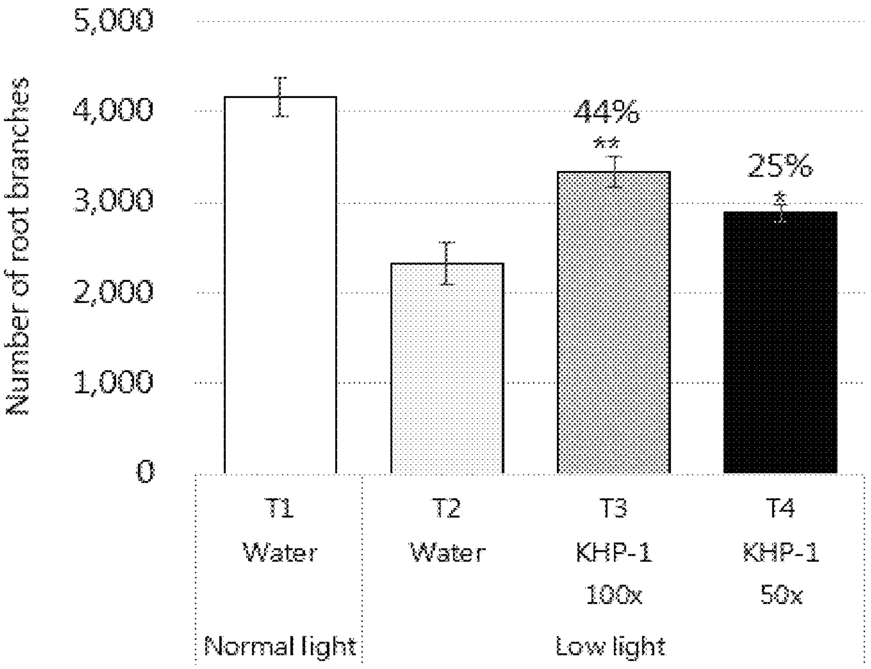
FIG. 4B shows the comparison shows the root branching-outs of the 3 low-light groups (T2, T3 and T4), compared to that of the normal light group (T1).

To assess the KHP solutions' impact on root system's development, the inventors use a digital scale, Shimadzu AP224X Analytical Balance, to measure the biomass, with the assistance of an Epson Expression 11000GXL scanner and the analysis app WinRHIZO, the improvement derived from KHP solutions to the root systems is shown in FIGS. 4A and 4B.

FIG. 4A shows that the low light group (T2) has worse overall root development than the normal light group (T1). With the application of the KHP-1 100× solution (T3) and KHP-1 50× solution (T4) caused the root length measurement to be 29% and 13% increase respectively, over that of the T2 group.

FIG. 4B shows the KHP solutions' effect to improve root development by measuring the root splitting/branching out. The root splitting counts, with the application of KHP-1 100× solution (T3) and KHP-1 50× (T4), show 1.44 times and 1.25 times, respectively, that of the T2 group.

The inventors experimented with another four (4) groups to compare the results of KHP solutions sprayed to the leaves of soybean plants:

| Group | Setting | Solution applied | Dilution |
|---|---|---|---|
| T5 | Normal setting | water | — |
| T6 | Low light setting | water | — |
| T7 | | KHP-2 | 500x |
| T8 | | KHP-3 | 500x |

In the experiment for the four (4) groups of T5-T8, KHP solutions are sprayed to the leaves of soybean plants (the specific KHP solution embodiments and dilution ratios as shown hereinabove), and seven days later, the second leaf of the soybean plants' above-ground portion, 6 plants from each group, are photographed, observed and measured to gauge the chlorophyll content and other growth indicators.

Figure 5A:
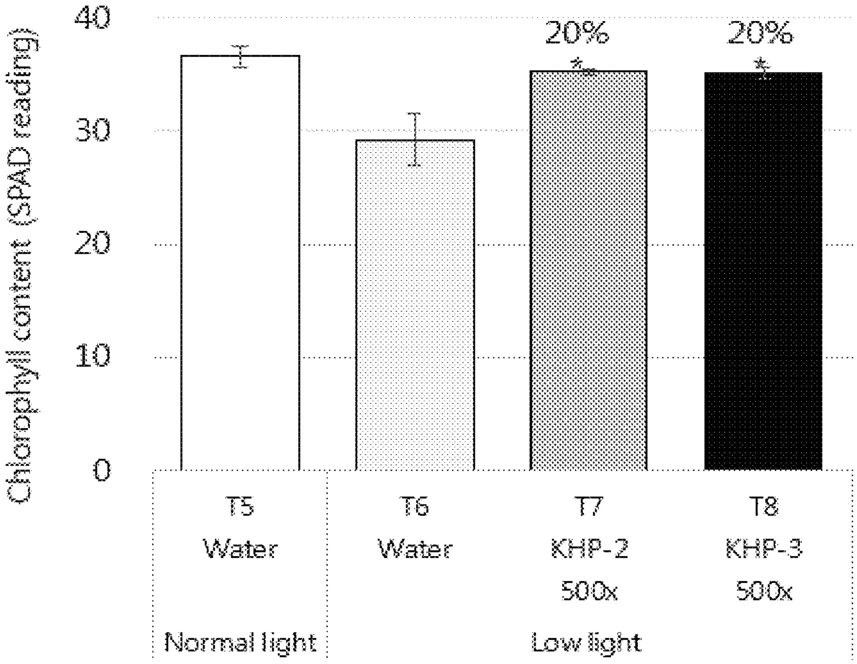
FIG. 5A shows the comparison of chlorophyll counts, on the second leaf of the soybean plants, in the 3 low-light groups (T6, T7 and T8), compared to that of the normal light group (T5).

Using a SPAD analysis instrument (2900 PDL, Spectrum Technologies), the effect of the leaf-spray of KHP solution is noted. As reflected in FIG. 5A, the chlorophyll content in the T6 group (low light, water only) is lower than that of the normal group T5. But with the leaf-spray application of the KHP-2 500× (T7) and KHP-3 500× (T8), the chlorophyll content is 1.2 times, for both T7 and T8, higher than that of the T6 content.

Figure 5B:
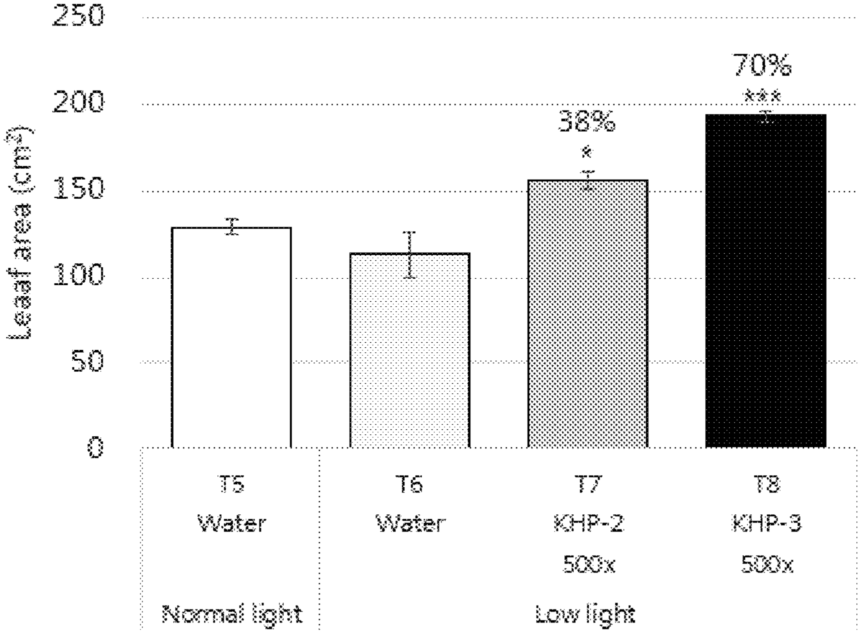
FIG. 5B shows the comparison of leaf areas in the 3 low-light groups (T6, T7 and T8), compared to that of the normal light group (T5).

FIG. 5B shows the measurement of leaf areas. The low light group T6 has smaller leaf area. With the leaf-spray application of the KHP-2 500× (T7) and KHP-3 500× (T8), the leaf areas are 1.38 times and 1.70 times, respectively, higher than that of T6 group.

Figure 5C:
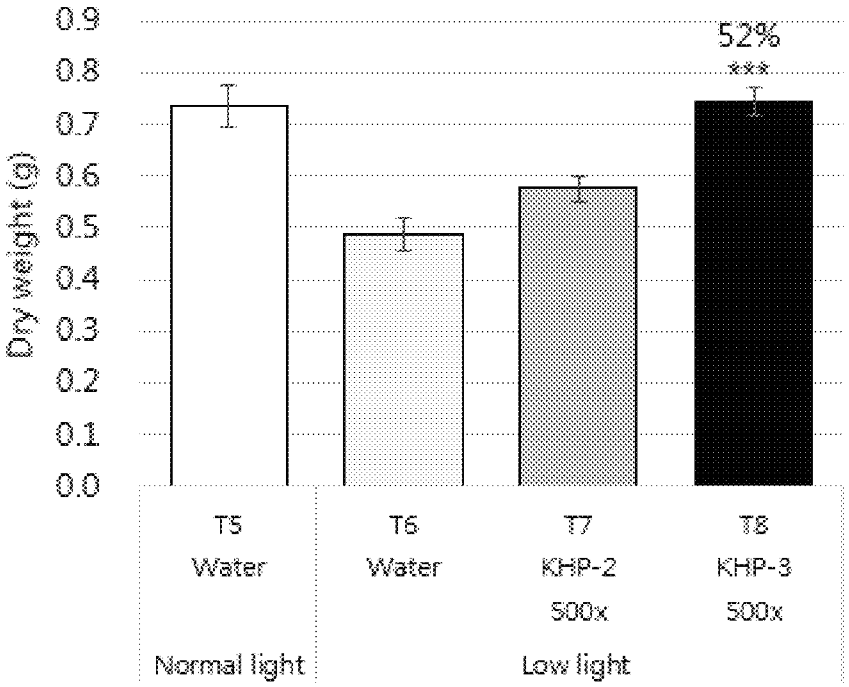
FIG. 5C shows the comparison of above-ground dry weights in the 3 low-light groups (T6, T7 and T8), compared to that of the normal light group (T5).

FIG. 5C shows the measure of the above-ground dry weights. The low light (T6) group shows lower reading than the normal light (T5) group. The leaf-spray application of KHP-3 500× (T8) shows 1.52 times of that of the T8 dry weight.

Figure 6A:
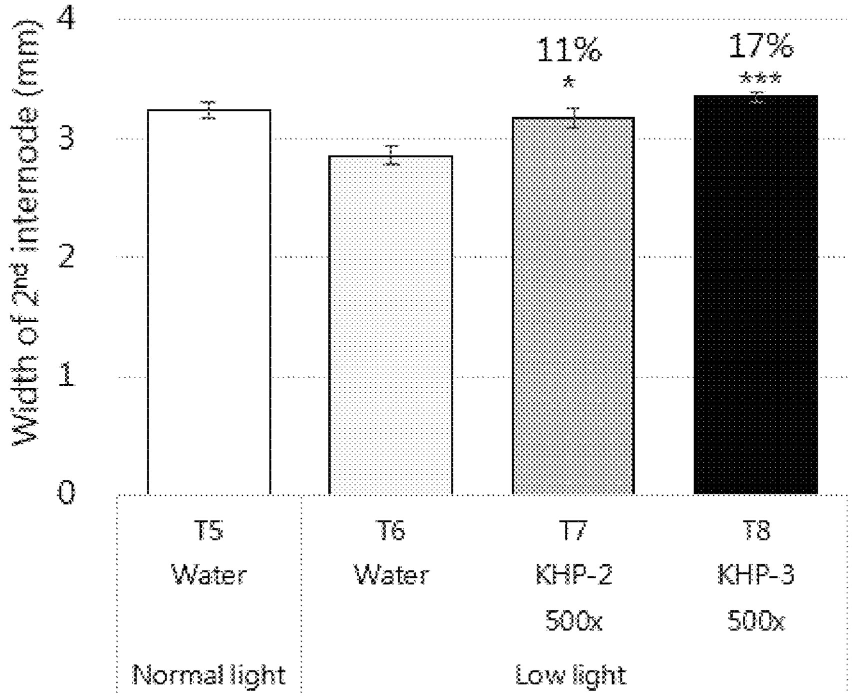
FIG. 6A shows the comparison of the second internode in the 3 low-light groups (T6, T7 and T8), compared to that of the normal light group (T5).

The measurements of the internode of the soybean plants are also a good indicator to show the effectiveness of leaf-spraying of KHP solutions. FIG. 6A shows that the second internode in the low light group (T6) is smaller than the normal light group (T5). With leaf-spray, the KHP-2 500× group (T7) and the KHP-3 500× group (T8) show second internode value to be 1.11 times and 1.17 times, respectively, that of the T6 group.

Figure 6B:
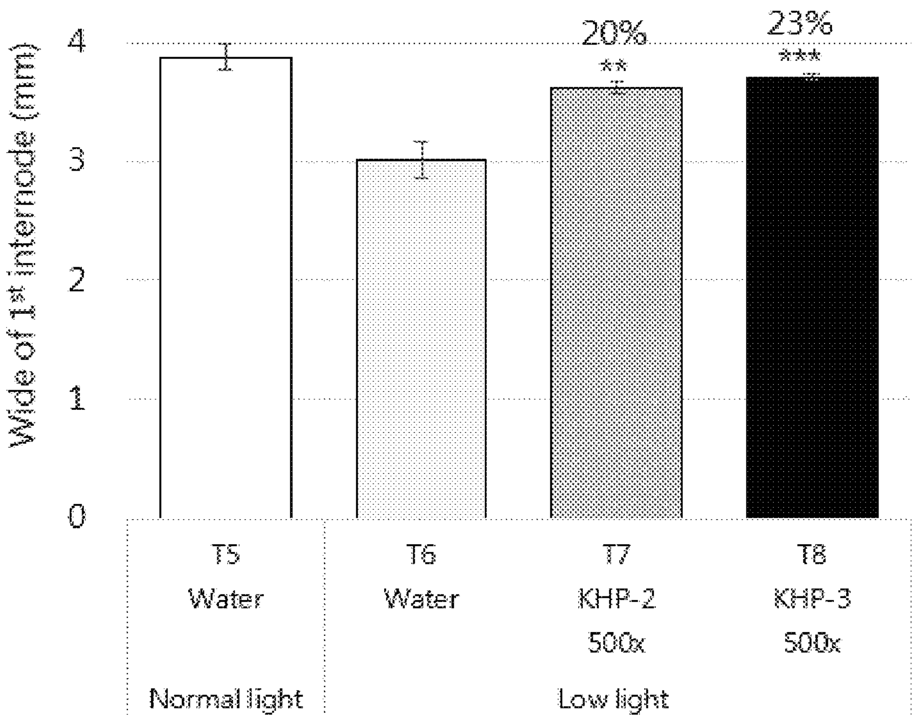
FIG. 6B shows the comparison of the first internode in the 3 low-light groups (T6, T7 and T8), compared to that of the normal light group (T5).

FIG. 6B shows the measurements of the first internode. With leaf-spray, the KHLP-2 500× (T7) and KHP-3 500× (T8) show 1.20 times and 1.23 times, respectively, that of the T6 group.

Figure 6C:
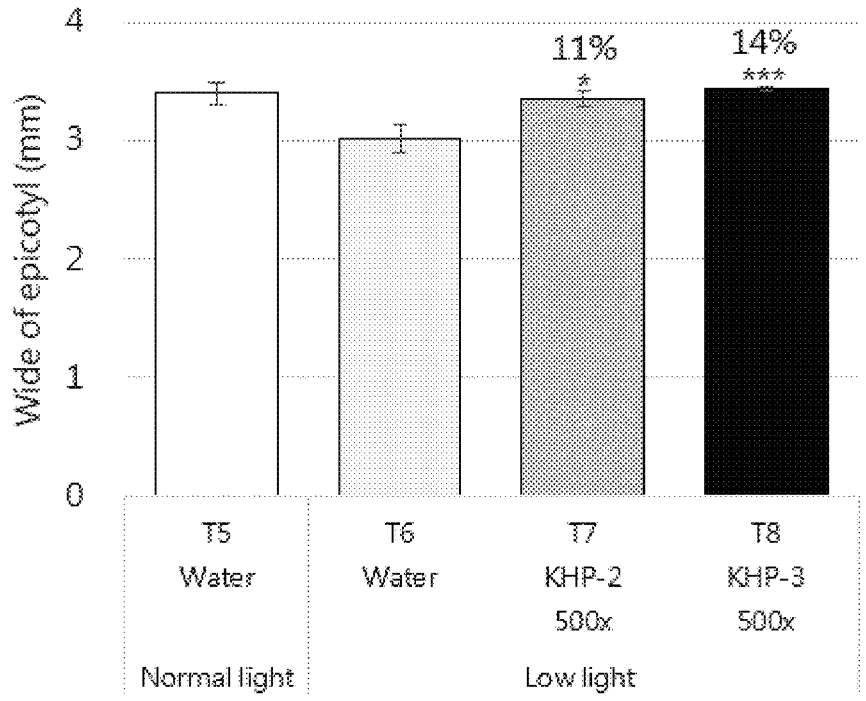
FIG. 6C shows the comparison of the epicotyl in the 3 low-light groups (T6, T7 and T8), compared to that of the normal light group (T5).

The leaf-spraying application of KHP solutions is reflected in FIG. 6C. The T6 group's epicotyl width is smaller than that of the T5 normal light group With leaf-spray application, the KHP-2 500× (T7) and the KHP-3 500× (T8) show the epicotyl width to be 1.11 times and 1.14 times, respectively, higher than that of the T6 group.

Figure 7:
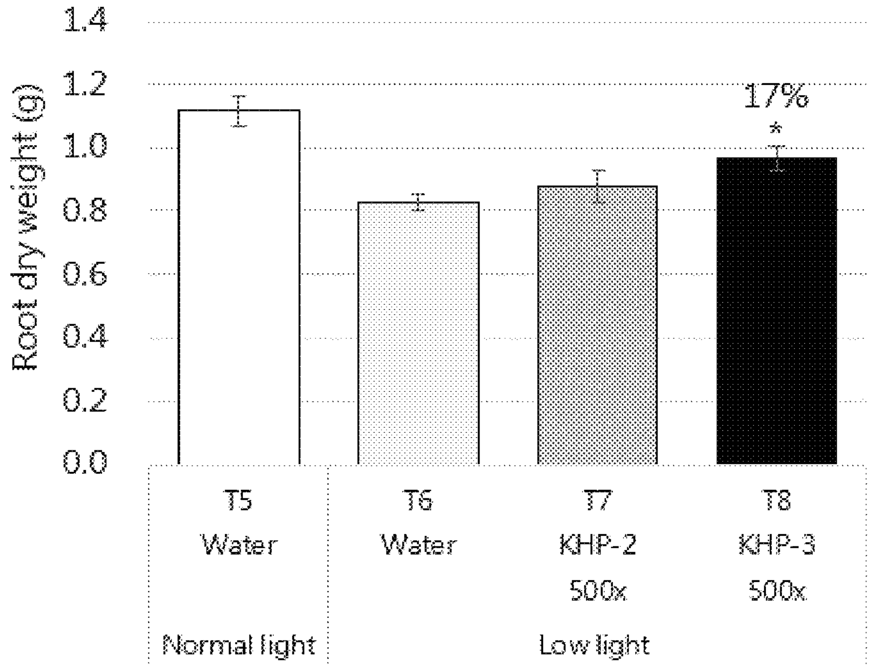
FIG. 7 shows the comparison of root's dry weights in the 3 low-light groups (T5, T6 and T7), compared to that of the normal light group (T5).

FIG. 7 shows another test to gauge root's development by measuring the dry weights of the roots. 14 days after leaf-spraying of the KHP solutions, the underground root portions of the soybean plants are retrieved, cleaned and heat-dried for obtaining the dry weight readings. The low light group (T6) shows smaller root dry weight than that of the normal light group. With leaf-spray application, the dry weights show substantial increase over that of the low light group; this is reflected in the KHP-3 500× group (T8), having increase of 17% over the T6 group.

As has been proven by the field tests, and the scientific analysis/measurement done by the inventors, the method of creating the KHP solution and the method of application to will help with the growth and root development of soybean even in low light conditions, and will reach the health conditions comparable to plants growing in normal light settings.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to promote the growth of soybean under low light condition, comprising the steps of:

a. Preparing the KHP solution by mixing 50 kg of feathers whose content is 50% water and 40 kg of water in a sealed container;

b. hydrolyzing the mixture in the container with a temperature and pressure setting of 185 °C and 12 kg/$cm^2$ for a duration of 80 minutes;

c. using a mass spectrometer to confirm the combination of peptides in the solution to contain 253 peptides as listed in the specification where their molecular masses are between 500 and 4,000 Daltons, and the concentration is in the range of $2.0\times10^5$~$4.5\times10^5$ ppm; and d. applying the solution to soybean seeds or young seedlings.

2. The method of using a keratin hydrolysis peptide solution of claim 1, wherein the solution is diluted with water by volume at the ratio of 1:50-500 for applying to the soybean seeds or young seedlings.

3. The method of using a keratin hydrolysis peptide (KHP) solution of claim 2, wherein the diluted solution is infused into the soil containing the soybean or by spraying to leaves of the young seedlings.

4. A method of using a keratin hydrolysis peptide (KHP) solution to promote the growth of soybean under low light conditions, comprising the steps of:

a. putting 70 kg of feathers, whose water content is 46%, in a sealed container;

b. stirring the feathers in said sealed container;

c. hydrolyzing the feathers in the container with a temperature and pressure setting of 180 °C and 13 kg/$cm^2$ for a duration of 40 minutes;

d. using a mass spectrometer to confirm the combination of peptides in the solution to contain 253 peptides as listed in the specification whereby their molecular masses are between 705.9 and 3,194.7 Dalton;

e. applying the solution to soybean seeds or young seedlings.

5. The method of using a keratin hydrolysis peptide solution of claim 4, wherein the solution is diluted with water by volume at the ratio of 1:50-500 for applying to the soybean seeds or young seedlings.

6. The method of using a keratin hydrolysis peptide (KHP) solution of claim 5, wherein the diluted solution is infused into the soil containing the soybean or by spraying to leaves of the young seedlings.

* * * * *